March 1, 1949.　　　　R. A. MENTEL　　　　2,463,293
HOSE END
Filed Feb. 18, 1946
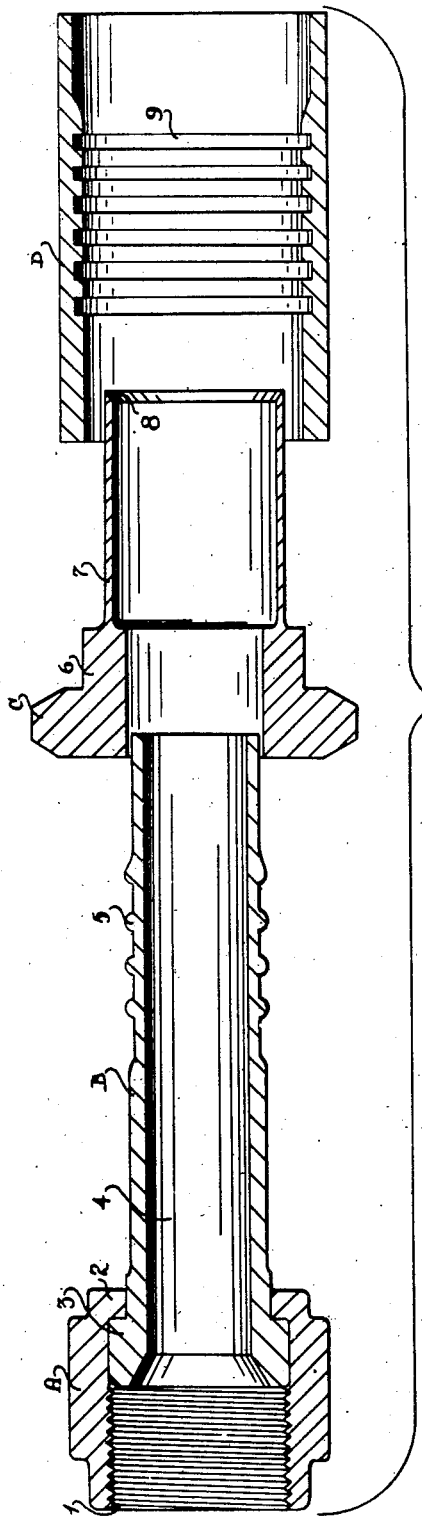
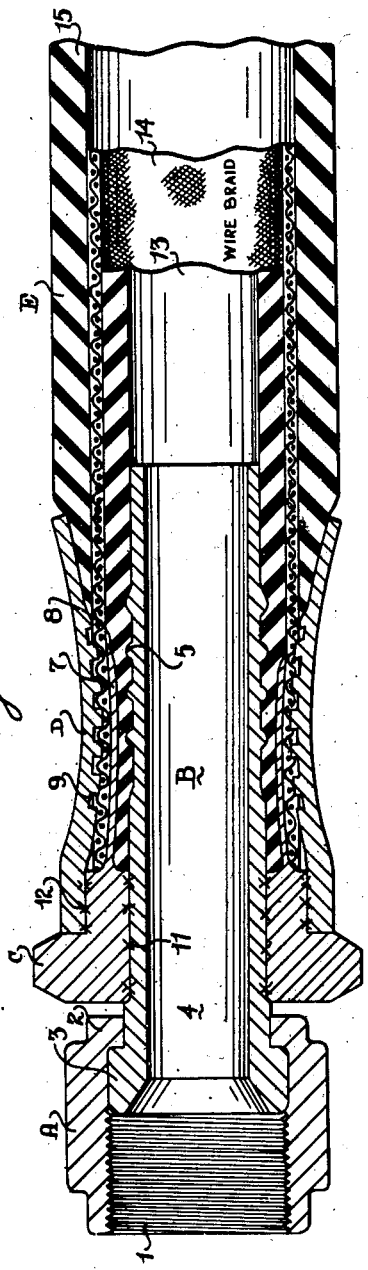
INVENTOR.
R. A. MENTEL
BY Richey & Watts.
ATTORNEYS Patented Mar. 1, 1949

2,463,293

UNITED STATES PATENT OFFICE 2,463,293

HOSE END

Raymond A. Mentel, East Cleveland, Ohio, assignor to The Weatherhead Company, Cleveland, Ohio, a corporation of Ohio Application February 18, 1946, Serial No. 648,328

3 Claims. (Cl. 285—84)

1

This invention relates to a hose end, more particularly to a hose end designed to be attached to a flexible hose or tube which includes a layer of wire braid.

As a general rule, fittings of the class to which this invention relates have included an internal sleeve member forced into the aperture of the hose and an external member formed to grip the hose itself and the internal sleeve member. It has been found that tubing and hoses which include a layer of wire braid present certain difficulties when provided with the conventional type of fitting. The most serious difficulty results from the puncturing or perforation of the innermost layer of the hose by the wire braid and leakage often occurs in such arrangements. It is an object of this invention to eliminate all possibility of injury of the rubber parts of the hose by the wire braid by the provision of a special hose end that contains a member which acts as a guard between the wire braid and the inner rubber portion of the hose.

Another difficulty encountered with prior art hose ends when used on hoses which include wire braid is that of leakage around the parts due to the relatively loose fit obtained when crimping wire braid and rubber together. It is another object of this invention to insure that no leakage can develop by the provision of a fitting especially adapted for use with hoses of the type containing wire braid. Other objects and advantages of this invention will become apparent as the following description of the device proceeds.

In the drawings:

Fig. 1 is an exploded cross-sectional view of various parts of the hose end or fitting.

Fig. 2 is a cross-sectional view of the fitting mounted on a hose.

Referring to Fig. 1 it can be seen that the fitting is made up of four basic members. Nut A is provided for attachment of the hose end with a suitable fitting. Nut A is mounted for rotation on a sleeve member B, and has internal threads 1 and a flanged portion 2 which cooperates with an enlarged portion 3 of sleeve member B to retain the nut. Sleeve member B has fluid conducting aperture 4 and external ribs 5 for engagement with the hose. Another sleeve member C is provided which member will hereinafter be referred to as the guard member. The guard member C includes a body portion 6 and an axially extending guard or lip portion 7 terminating in a sharp edge 8. The external sleeve

2 member D completes the fitting, this member having internal serrations or ribs 9.

As can be seen in Fig. 2 the fitting is assembled in such a manner that members B, C and D are in effect integral, this being accompanied by soldering or brazing parts B, C and D at areas 11 and 12. The fitting is applied to the hose in the following manner:

First, any outer layer or layers of rubber 15 which cover the wire braid of the hose are removed back to a distance approximately equal to the extent of the serrations as on the sleeve member D. The fitting itself is placed in a lathe or other rotating device so that it may be continuously rotated. The hose is then applied to the end of the fitting with which sleeve member B enters the aperture in the hose, and guard portion 7 of member C works its way between the wire braid and the inner layer of rubber 13. This action is facilitated by the sharp edge 8 of sleeve member C. At the same time, sleeve member D is being forced along the wire braid but this member is of such a diameter that the ribs 9 thereon exert very little, if any, pressure against the braid during the initial assembly. After the fitting has been forced into the hose as described above, a crimping operation is performed upon the sleeve D which causes it to become reduced in diameter as shown in Fig. 2 thereby crimping the braid against guard portion 7 of sleeve C. A compression is also put on guard portion 7 by this operation which forces the inner layer of rubber 13 firmly against the ribs 5 on inner sleeve member B.

Those skilled in the art will readily appreciate the advantages which are derived from this novel hose end. First, guard member 7 protects the inner rubber portion 13 of the hose from any perforation or laceration by wire braid 14 of the hose. This is highly important because any perforation of the inner rubber member 13 around the fitting would cause leakage. Another advantage in this arrangement is that a very strong joint is produced which joint will withstand severe axial loads before the fitting will pull free of the hose. The strength of this joint results from the fact that two gripping actions take place between the hose and the fitting. First, there is the gripping action taking place between the sleeve D, guard portion 7 of sleeve C and the wire braid 14. Next, there is the gripping action between guard portion 7 and ribs 5 of sleeve B which action firmly grips the inner rubber layer 13 of the hose.

Another advantage resulting from this arrangement lies in the fact that a hose fitted in accordance with this invention tends to be self-sealing against leakage. For example, assume that a small amount of fluid tends to leak past ribs 5 of sleeve B. As this fluid continues it can only leak out by traveling between the inner surface of guard member 7 and the outer surface of rubber layer 13 of the hose. If the fluid gets this far the pressure against it tends to still further increase the gripping action which takes place between ribs 5 of sleeve B and rubber layer 13 of the hose. For this reason if by any chance leakage does start it is rapidly stopped by the pressure of the fluid itself, this beneficial and unexpected result being a function of guard portion 7 in the fitting.

Although a preferred embodiment of the invention is shown in the drawings, those skilled in the art will appreciate that minor modifications may be made without departing from the spirit of the invention. For example, guard member 7 which is shown integral with body portion 6 and sleeve C in the drawings could be made of separate tubular stock welded or brazed to the body portion 6. Likewise the exact number and shape of the ribs 5 and 9 can be modified slightly without altering the operation of the device. Furthermore, although an attaching nut A is shown in the drawing for connecting the hose to another fitting, this is merely shown as being illustrative of standard practice and any suitable form of connecting means for the fitting could be provided without modifying the nature of the sealing joint produced by the fitting. In addition, the fitting is shown applied to a hose which includes two rubber layers and one braid layer. Actually, of course, each rubber layer could be made up of any number of layers of rubber or rubber and fabric, the basic principle being unchanged that the guard member 7 of the fitting protects the inner layers of rubber or rubber and fabric from the wire braid. Likewise, it would not be necessary to show the outer layer of rubber entirely down to the wire braid in order for the fitting to function.

Having thus described the present invention so that others skilled in the art may be able to understand and practice the same, I state that what I desire to secure by Letters Patent is defined in what is claimed.

What is claimed is:

1. In combination with a hose which comprises a layer of flexible non-metallic material surrounded by a layer of wire braid, a unitary fitting having an inner sleeve member positioned within the aperture of said hose, an intermediate member having a guard portion with relatively thin walls positioned between said wire braid and said non-metallic layer of material, and an outer sleeve member formed to compress said wire braid against said guard portion, said outer sleeve member having a ribbed internal diameter substantially equal to the diameter of the hose and being radially deformable to compress the hose between the guard member and the insert and between said sleeve and the guard member.

2. In combination with a hose which comprises a layer of flexible non-metallic material surrounded by a layer of wire braid, a unitary fitting having an inner sleeve member positioned within the aperture of said hose, an intermediate member having a guard portion with relatively thin walls positioned between said wire braid and said non-metallic layer of material, and an outer member having a portion integral with an axially outer portion of said intermediate member and a deformable sleeve portion overlying said guard portion and said inner sleeve, said deformable sleeve portion being deformed to compress said wire braid against said guard portion, and said guard portion being deformed to compress said layer of non-metallic material against said inner sleeve.

3. A unitary hose end fitting comprising an inner sleeve member, an outer sleeve member and an intermediate member having an axially extending cylindrical guard portion said guard portion having relatively thin walls, said outer sleeve member having a portion overlying said guard member of an internal diameter substantially equal to the diameter of the hose and radially deformable to compress a layer of hose between the guard member and the insert, said guard member being deformable due to said compression to compress another layer of hose against said sleeve.

RAYMOND A. MENTEL.

REFERENCES CITED

The following references are of record in the file of this patent:

UNITED STATES PATENTS

| Number | Name | Date |
| --- | --- | --- |
| 2,076,632 | Goodall | Apr. 13, 1937 |
| 2,328,819 | Luebkeman | Sept. 7, 1943 |